(12) United States Patent
Baumgarten et al.

(10) Patent No.: US 9,334,063 B2
(45) Date of Patent: May 10, 2016

(54) AIRCRAFT AVIONICS TABLET INTERFACE MODULE

(75) Inventors: William J. Baumgarten, Burnsville, MN (US); Michael J. Haukom, Burnsville, MN (US); Thomas J. Horsager, Burnsville, MN (US); Daniel L. McDowell, Burnsville, MN (US)

(73) Assignee: ROSEMOUNT AEROSPACE, INC., Burnsville, ME (US)

(*) Notice: Subject to any disclaimer, the term of this patent is extended or adjusted under 35 U.S.C. 154(b) by 269 days.

(21) Appl. No.: 13/608,100

(22) Filed: Sep. 10, 2012

(65) Prior Publication Data

US 2014/0074322 A1    Mar. 13, 2014

(51) Int. Cl.
| | |
|---|---|
| G01C 23/00 | (2006.01) |
| G05D 1/00 | (2006.01) |
| G06F 17/00 | (2006.01) |
| B64D 45/00 | (2006.01) |
| G05B 23/02 | (2006.01) |

(52) U.S. Cl.
CPC ............ B64D 45/00 (2013.01); G05B 23/0216 (2013.01); G05B 2219/23406 (2013.01)

(58) Field of Classification Search
USPC .................................................... 701/1, 3–18
See application file for complete search history.

(56) References Cited

U.S. PATENT DOCUMENTS

| | | | | |
|---|---|---|---|---|
| 6,092,008 | A * | 7/2000 | Bateman | 701/14 |
| 6,181,990 | B1 * | 1/2001 | Grabowsky et al. | 701/14 |
| 6,201,797 | B1 * | 3/2001 | Leuca et al. | 370/316 |
| 6,401,013 | B1 * | 6/2002 | McElreath | 701/3 |
| 6,512,975 | B2 * | 1/2003 | Watson | 701/120 |
| 7,162,235 | B1 * | 1/2007 | Gilbert | 455/431 |
| 7,908,042 | B2 * | 3/2011 | Brinkley et al. | 701/3 |
| 8,495,722 | B1 * | 7/2013 | McCusker | 726/10 |
| 8,649,785 | B2 * | 2/2014 | Durand et al. | 455/431 |
| 2002/0111720 | A1 * | 8/2002 | Holst et al. | 701/3 |
| 2002/0123344 | A1 | 9/2002 | Criqui et al. | |
| 2002/0160773 | A1 * | 10/2002 | Gresham et al. | 455/431 |
| 2003/0109973 | A1 * | 6/2003 | Hensey et al. | 701/35 |
| 2005/0026608 | A1 * | 2/2005 | Kallio et al. | 455/431 |
| 2006/0009262 | A1 | 1/2006 | Hamm | |
| 2008/0007396 | A1 * | 1/2008 | Parkulo et al. | 340/539.2 |
| 2010/0105329 | A1 * | 4/2010 | Durand et al. | 455/41.2 |
| 2010/0198431 | A1 * | 8/2010 | Corbefin | 701/3 |
| 2012/0050066 | A1 * | 3/2012 | Pendse | 340/870.07 |
| 2012/0191273 | A1 * | 7/2012 | Jacobs et al. | 701/3 |
| 2012/0295537 | A1 * | 11/2012 | Zaruba et al. | 455/12.1 |

* cited by examiner

*Primary Examiner* — Bhavesh V Amin
(74) *Attorney, Agent, or Firm* — Cantor Colburn LLP

(57) ABSTRACT

An aircraft avionics system including an aircraft interface device configured to communicate with an aircraft avionics system and a tablet interface module configured to communicate with the aircraft interface device and with one or more tablets. The aircraft avionics system includes a plurality of sensors for an aircraft and the tablet interface module provides the one or more tablets with information received from the aircraft interface device.

11 Claims, 3 Drawing Sheets

AIRCRAFT AVIONICS TABLET INTERFACE MODULE

BACKGROUND OF THE INVENTION

The present disclosure relates to the field of aircraft avionics, and more specifically, to an aircraft avionics tablet interface module.

Aircraft avionics systems include a large number of sensors, communication systems and navigation systems that can be used during the operation of the aircraft and for maintenance of the aircraft. Currently available avionics systems include one or more displays that can be used by operators for various functions.

As the use of tablet computing devices becomes more prevalent, many operators of aircraft would like to use these tablet devices to interface with the aircraft avionics system. However, due to reliability, safety and security reasons aircraft avionics systems are typically closed systems which do not permit operators from using non-integrated electronics, such as commercially available tablet devices, to communicate with the avionics system. In addition, due to possible interference that may be caused by such tablet devices, the use of tablet devices on the flight deck of the aircraft has been restricted.

BRIEF DESCRIPTION OF THE INVENTION

According to one embodiment, an aircraft avionics system includes an aircraft interface device configured to communicate with an aircraft avionics system and a tablet interface module configured to communicate with the aircraft interface device and with one or more tablets. The aircraft avionics system includes a plurality of sensors for an aircraft and the tablet interface module provides the one or more tablets with information received from the aircraft interface device.

Accordingly to another embodiment, a tablet interface module includes a first transceiver configured to communicate with one or more tablets and a second transceiver configured to communicate with an aircraft interface device. The tablet interface module also includes a user interface module. The tablet interface module is configured to receive information regarding a plurality of sensors for an aircraft from the aircraft interface device and to transmit the information to the one or more tablets.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
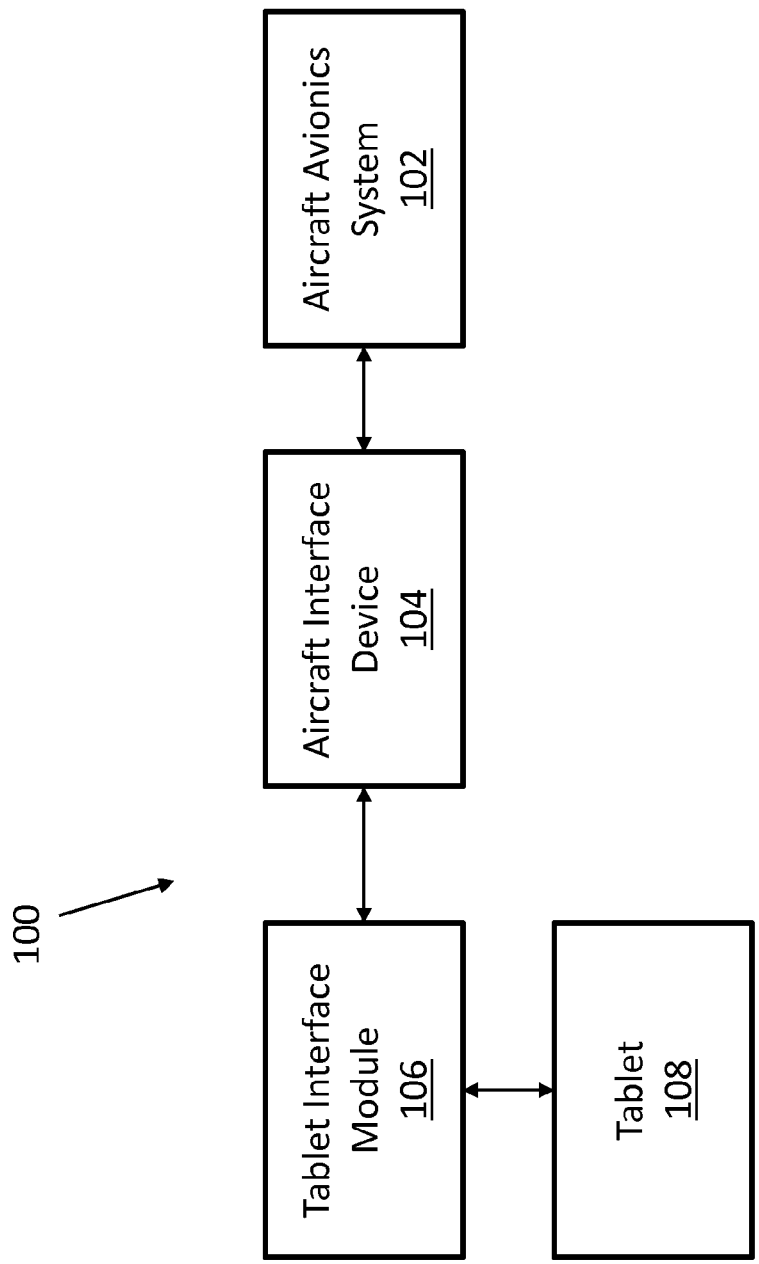
FIG. 1 is a block diagram of a system including a tablet interface module and an aircraft interface device in accordance with an embodiment of the disclosure.

Referring now to FIG. 1, a block diagram of a system 100 in accordance with an embodiment of the disclosure is shown. As illustrated, the system 100 includes an aircraft avionics system 102, an aircraft interface device 104, a tablet interface module 106, and a tablet 108. In certain or example embodiments, the aircraft avionics system 102 may include, but is not limited to, multiple sensors, communications systems and navigation systems. The aircraft avionics system 102 provides data to the aircraft interface device 104, which acts as a data concentrator for the aircraft avionics system 102. In one embodiment, the aircraft interface device 104 is configured for connection to one or more operationally approved devices and to act as a partition between the aircraft avionics system 102 and the operationally approved devices. In one embodiment, the tablet interface module 106 is an operationally approved device that may be connected to the aircraft interface device 104. The tablet interface module 106 in such an embodiment is configured to subscribe to application requested data received from the aircraft interface module 104. In one embodiment, the tablet 108 is configured to communicate, either wired or wirelessly, with the tablet interface module 106 using any suitable communications protocol. As used herein, the term "tablet" refers to any commercially available tablet computing device, smartphone, laptop or other mobile computing device.

In one embodiment, the use of the tablet interface module 106 and the aircraft interface device 104 permits aircraft operators to use commercially available tablets 108 to receive data from the aircraft avionics system 102 without requiring the tablets 108 to be certified devices. In one embodiment, the system 100 can be used for both inflight operations as well as maintenance functions. For example, the system 100 can be used for storing flight log data, pilot reports, aircraft fault isolation applications, aircraft troubleshooting, moving map applications, and administrative communications functions. In one embodiment, the tablet interface module 106 is configured to be mounted to an interior wall of an aircraft on the flight deck, such that aircraft operators on the flight deck can easily access the tablet interface module 106.

Figure 2:
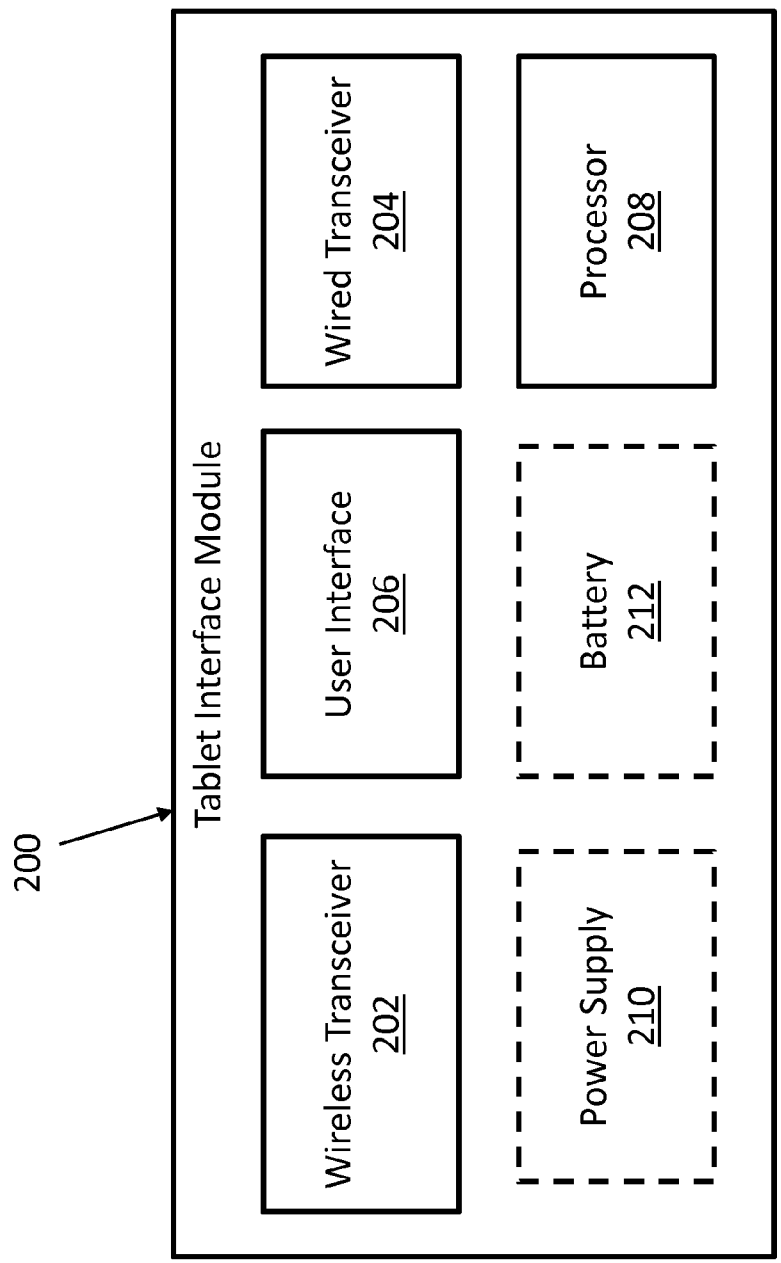
FIG. 2 is a block diagram of tablet interface module in accordance with an embodiment of the disclosure.

Referring now to FIG. 2, a block diagram of a tablet interface module 200 in accordance with an embodiment of the disclosure is shown. As illustrated, the tablet interface module 200 may include a wireless transceiver 202, a wired transceiver 204, a user interface 206 and a processor 208. The wireless transceiver 202 is configured to communicate with one or more tablets and may be configured to use a variety of known wireless communications protocols. For example, the wireless transceiver 202 may be configured to communicate with the tablets via WiFi, Bluetooth, or the like. The wired transceiver 204 is configured to communicate with the tablet and aircraft interface device and may be configured to use a variety of known wired communications protocols. For example, the wired transceiver 204 may be configured to communicate with the tablets via Ethernet (using TCP/IP, UDP or the like), a serial connection (using SSP, SIP or the like) (i.e., 232/422/485), or the like. In exemplary embodiments, the wired transceiver 204 may also be configured to communicate with one or more tablets. The tablet interface module 200 also includes a processor 208 which can be any custom made or commercially available processor, a central processing unit (CPU), an auxiliary processor among several processors, a semiconductor based microprocessor (in the form of a microchip or chip set), a macroprocessor, or generally any device for executing instructions.

In one embodiment, the tablet interface module 200 includes a user interface 206 that is configured to enable a user to connect the tablet interface module 200 to a tablet, such as, in a non-limiting example, tablet 108 shown in FIG. 1. In addition, the user interface 206 may include an indicator, which is configured to indicate if the tablet interface module 200 is connected to a tablet. In one example, the wireless transceiver 202 is configured to use Bluetooth to communicate with the tablet and the user interface 206 includes a pair button which allows the user of the tablet to connect the tablet to the tablet interface module 200. The indicator of the user interface 206 may be a light that indicates that a tablet is connected to the tablet interface module 206. In one embodiment, the tablet interface module 200 may be configured to connect to multiple tablets and the user interface 206 may include a plurality of pair buttons and indicator lights.

In one embodiment, the tablet interface module 200 may also include a battery 212 and/or power supply 210. In one embodiment, the tablet interface module 200 may include a power supply 210 that is configured to condition power received from the aircraft interface device and isolate the tablet interface module 200 from the aircraft power system. In one embodiment, the tablet interface module 200 may be configured to operate solely off of power received from the battery 212 and may have a low power design. In one embodiment, the tablet interface module 200 may be configured to connect to multiple tablet devices and may include a physical connection port for connecting to the tablet devices to provide charging and communications between the tablet interface module 200 and the tablet. For example, the tablet interface module 200 may include one or more universal serial bus (USB) connectors for connecting to tablet devices.

In one embodiment, the wireless transceiver 202 of the tablet interface module 200 may be selected or designed to provide a low power and low visibility communications link to the tablet. For example, the wireless transceiver 202 may be selected to be a Bluetooth 4.0, IEEE 802, or the like capable device. The wireless transceiver 202 is designed such that it is capable of communicating with tablets in close proximity to the tablet interface module 200 and such that the signals that it emits do not interfere with the electronics of the aircraft. In one embodiment, the tablet interface module 200 is configured to provide multiple layers of security to prevent unauthorized access to the tablet interface module 200. Physical access to the tablet interface module 200 is limited to individuals authorized to access the flight deck where the tablet interface module 200 is located. In addition, the tablet interface module 200 is configured such that pairing or connecting to the tablet interface module 200 can only be initiated from the tablet interface module 200 and not a tablet device. Furthermore, the wireless transceiver 202 of tablet interface module 200 may be configured to encrypt data that is transmitted.

Figure 3:
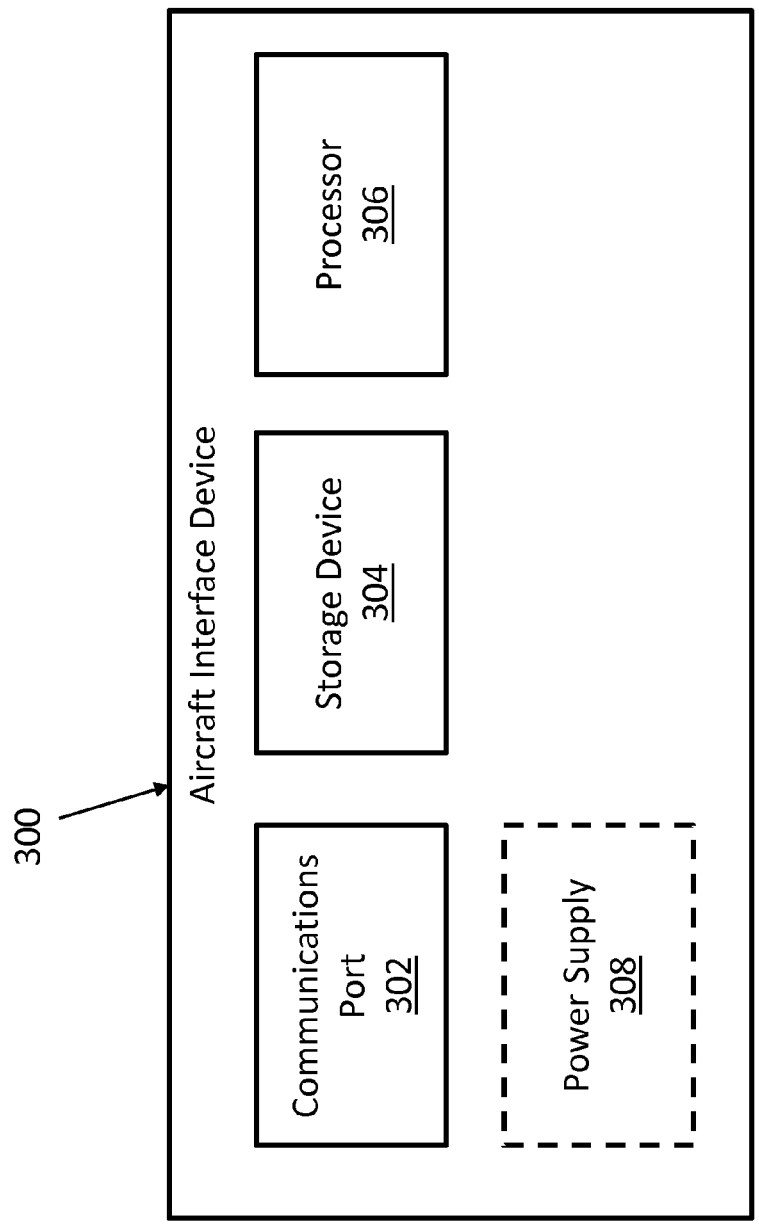
FIG. 3 is a block diagram of an aircraft interface device in accordance with an embodiment of the disclosure.

Referring now to FIG. 3, a block diagram of an aircraft interface device 300 in accordance with an embodiment of the disclosure is shown. As illustrated, the aircraft interface device 300 includes a communications port 302, a storage device 304 and a processor 306. The communications port 302 is configured to connect the aircraft interface device 300 to both the tablet interface module and the aircraft avionics system. In one embodiment, the storage device 304 is configured to store the data received from the aircraft avionics system. The storage device 304 may include, but is not limited to, any one or combination of volatile memory elements (e.g., random access memory (RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the storage device 304 may incorporate electronic, magnetic, optical, and/or other types of storage media. The aircraft interface device 300 also includes a processor 306 which can be any custom made or commercially available processor, a central processing unit (CPU), an auxiliary processor among several processors, a semiconductor based microprocessor (in the form of a microchip or chip set), a macroprocessor, or generally any device for executing instructions.

In one embodiment, the communications port 302 may include multiple interfaces for receiving information from various components of the aircraft avionics system and for communicating with the tablet interface module. For example, the aircraft interface device 300 may include, but is not limited to, an Ethernet interface, an ARINC 429 interface, an ARINC 717 interface, a USB interface, an RS-232 interface, a RS-422 interface, a RS-485 interface, a SPI interface, a I2C interface, or the like for communicating with the aircraft avionics system and/or the tablet interface module. In one embodiment, by connecting a tablet to the aircraft interface device through the tablet interface module, the tablet is able to access information regarding the entire aircraft avionics system.

In one embodiment, the aircraft interface device 300 may include a power supply 308 that is configured to condition power received from a power system of the aircraft and to provide power to the tablet interface module. The power supply 308 is also configured to isolate the tablet interface module from the aircraft power system.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A aircraft avionics system, the system comprising:
   a aircraft interface device configured to communicate with an aircraft avionics system, wherein the aircraft avionics system comprises a plurality of sensors for an aircraft; and
   a tablet interface module configured to communicate with the aircraft interface device and with one or more tablets, wherein the tablet interface module includes a user interface that is configured to establish, via a wireless transceiver, a communications channel between the tablet interface module and the one or more tablets and an indicator configured to indicate if the tablet interface module is connected to the one or more tablets, and
   wherein the communications channel can only be established by initiation from the tablet interface module and not the one or more tablets, and the communications channel is encrypted by the wireless transceiver; and wherein the tablet interface module provides the one or more tablets with information received from the aircraft interface device and wherein the tablet interface module comprises a power supply configured to connect to a power system of the aircraft and to provide power to the one or more tablet devices.

2. The aircraft avionics system of claim 1, wherein the aircraft interface device is configured to store data received from the aircraft avionics system.

3. The aircraft avionics system of claim 1, wherein the aircraft interface device is configured to partition the aircraft avionics system from the tablet interface module.

4. The aircraft avionics system of claim 1, wherein the aircraft interface device is configured to condition power received from a power system of the aircraft and isolates the tablet interface module from the aircraft power system.

5. The aircraft avionics system of claim 1, wherein the tablet interface module comprises:
   a transceiver configured to communicate with the aircraft interface device.

6. The aircraft avionics system of claim 1, wherein the wireless transceiver is a low power low visibility radio frequency transceiver.

7. The aircraft avionics system of claim 5, wherein the power supply is configured to condition power received from the power system of the aircraft and isolates the one or more tablets from the aircraft power system.

8. A tablet interface module, the device comprising:
   a first transceiver configured to communicate with one or more tablets;
   a second transceiver configured to communicate with a aircraft interface device; and
   a user interface module configured to establish a communications channel between the tablet interface module and the one or more tablets,
   wherein the user interface module includes an indicator configured to indicate if the tablet interface module is connected to the one or more tablets,
   wherein the communications channel can only be established by initiation from the tablet interface module and not the one or more tablets, and the communications channel is encrypted by the wireless transceiver; and
   wherein the tablet interface is configured to receive information regarding a plurality of sensors for an aircraft from the aircraft interface device and to transmit aircraft interface device information to the one or more tablets and wherein the tablet interface module further comprises a power supply configured to connect to a power system of the aircraft and to provide power to the one or more tablet devices.

9. The tablet interface module of claim 8, wherein the first transceiver is a low power low visibility radio frequency transceiver.

10. The tablet interface module of claim 8, wherein the power supply is configured to condition power received from the power system of the aircraft and isolate the one or more tablets from the aircraft power system.

11. The aircraft avionics system of claim 8, wherein the tablet interface module comprises:
   a first wired transceiver configured to communicate with the one or more tablets;
   a second wired transceiver configured to communicate with the aircraft interface device.

* * * * *